(12) United States Patent
Yu et al.

(10) Patent No.: US 10,187,324 B2
(45) Date of Patent: Jan. 22, 2019

(54) SYSTEM AND METHOD FOR RESOURCE MANAGEMENT

(71) Applicant: Futurewei Technologies, Inc., Plano, TX (US)

(72) Inventors: Fang Yu, Beijing (CN); Zhixian Xiang, Plano, TX (US); Haitao Xia, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 231 days.

(21) Appl. No.: 15/199,805

(22) Filed: Jun. 30, 2016

(65) Prior Publication Data

US 2017/0048165 A1 Feb. 16, 2017

Related U.S. Application Data

(60) Provisional application No. 62/203,223, filed on Aug. 10, 2015.

(51) Int. Cl.
*H04L 12/911* (2013.01)
*G06F 9/455* (2018.01)
*G06F 9/50* (2006.01)
*H04L 12/24* (2006.01)

(52) U.S. Cl.
CPC .......... *H04L 47/82* (2013.01); *G06F 9/45558* (2013.01); *G06F 9/5077* (2013.01); *H04L 41/044* (2013.01); *H04L 41/5054* (2013.01); *H04L 41/5096* (2013.01); *G06F 2009/45595* (2013.01)

(58) Field of Classification Search
USPC ....................................... 709/226, 200, 217
See application file for complete search history.

(56) References Cited

U.S. PATENT DOCUMENTS

2016/0205004 A1* 7/2016 Chou ..................... H04L 43/08
709/224
2017/0150399 A1* 5/2017 Kedalagudde ........ H04W 28/08

* cited by examiner

*Primary Examiner* — El Hadji M Sall
(74) *Attorney, Agent, or Firm* — Futurewei Technologies, Inc.

(57) ABSTRACT

Systems and methods are disclosed for resource management by a network functions virtualization orchestrator (NFVO). These systems and methods include embodiments whereby a NFVO obtains requirements for a network service lifecycle management (LCM) operation, determines a delegating granting decision for a virtualized network function (VNF) manager (VNFM) associated with the network service LCM operation in accordance with the requirements for the network service LCM operation that grants a permission for the VNFM to perform multiple VNF LCM operations under one or more constraints, and sends the delegating granting decision to the VNFM.

19 Claims, 7 Drawing Sheets

SYSTEM AND METHOD FOR RESOURCE MANAGEMENT

The present application claims priority to U.S. Provisional Patent Application No. 62/203,223, filed Aug. 10, 2015 and entitled "System and Method for Delegating VNF Deployment," which is incorporated herein by reference as if reproduced in its entirety.

TECHNICAL FIELD

The present disclosure relates to a network function virtualization (NFV) system, and, in particular embodiments, to a system and method for resource management in the NFV system.

BACKGROUND

NFV is an industry effort to virtualize network equipment using generic-build hardware platforms, with the goals of cost reduction, efficient/agile network operation, and performance. NFV is the principle of separating network functions from the hardware they run on using virtual hardware abstraction, and seeks to virtualize entire classes of network node functions into building blocks that may be connected (or chained together) to create communication services.

SUMMARY

In one embodiment, a method for resource management is disclosed that includes obtaining, by a network functions virtualization orchestrator (NFVO), requirements for a network service lifecycle management (LCM) operation, determining, by the NFVO, a delegating granting decision for a virtualized network function (VNF) manager (VNFM) associated with the network service LCM operation in accordance with the requirements for the network service LCM operation that grants a permission for the VNFM to perform multiple VNF LCM operations under one or more constraints, and sending, by the NFVO, the delegating granting decision to the VNFM.

In another embodiment, a system for resource management is disclosed that includes a memory storage comprising instructions and one or more processors in communication with the memory. In one embodiment, the one or more processors execute the instructions to obtain requirements for a network service lifecycle management (LCM) operation, determine a delegating granting decision for a virtualized network function (VNF) manager (VNFM) associated with the network service LCM operation in accordance with the requirements, wherein the delegating granting decision indicates a permission allowed by a network functions virtualization orchestrator (NFVO) for the VNFM to perform multiple VNF LCM operations under one or more constraints, and send the delegating granting decision to the VNFM.

In yet another embodiment, a method for resource management is disclosed that includes determining, by the network functions virtualization orchestrator (NFVO), a delegating granting decision for a virtualized network function (VNF) manager (VNFM) in accordance with a request by the VNFM, wherein the delegating granting decision indicates a permission allowed for the VNFM to perform multiple VNF LCM operations under one or more constraints and sending, by the NFVO, the delegating granting decision to the VNFM.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

It should be understood at the outset that, although an illustrative implementation of one or more embodiments are provided below, the disclosed systems, apparatuses, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

The lifecycle management of resources may include a set of functions required to manage the instantiation, maintenance and termination of various functions of a NFV. Lifecycle management allows for the allocation of resources based upon the present operational requirements of the system and may be used to prevent resources from being underutilized. As will be discussed in the present disclosure, a method for resource management is contemplated that includes obtaining requirements for a network service lifecycle management (LCM) operation, determining a delegating granting decision for a virtualized network function (VNF) manager (VNFM) associated with the network service LCM operation in accordance with the requirements, and sending the delegating granting decision to the VNFM. It is understood that in some embodiments, the delegating granting decision indicates a permission allowed for the VNFM to perform multiple VNF LCM operations under one or more constraints. By allowing the VNFM to perform multiple VNF LCM operations under one or more constraints, the VNFM does not have to send a request for permission to the NFVO for each subsequent VNF LCM operation to be performed each time. It can reduce a high traffic exchange between the VNFM and the NFVO during VNF LCM operations. Moreover, the NFVO makes the VNFM aware of one or more constraints on network service level to ensure that the one or more constraints are satisfied. A more flexible and intelligent system on VNF LCM operations may be provided. These and other advantages will be discussed more fully below.

Figure 1:
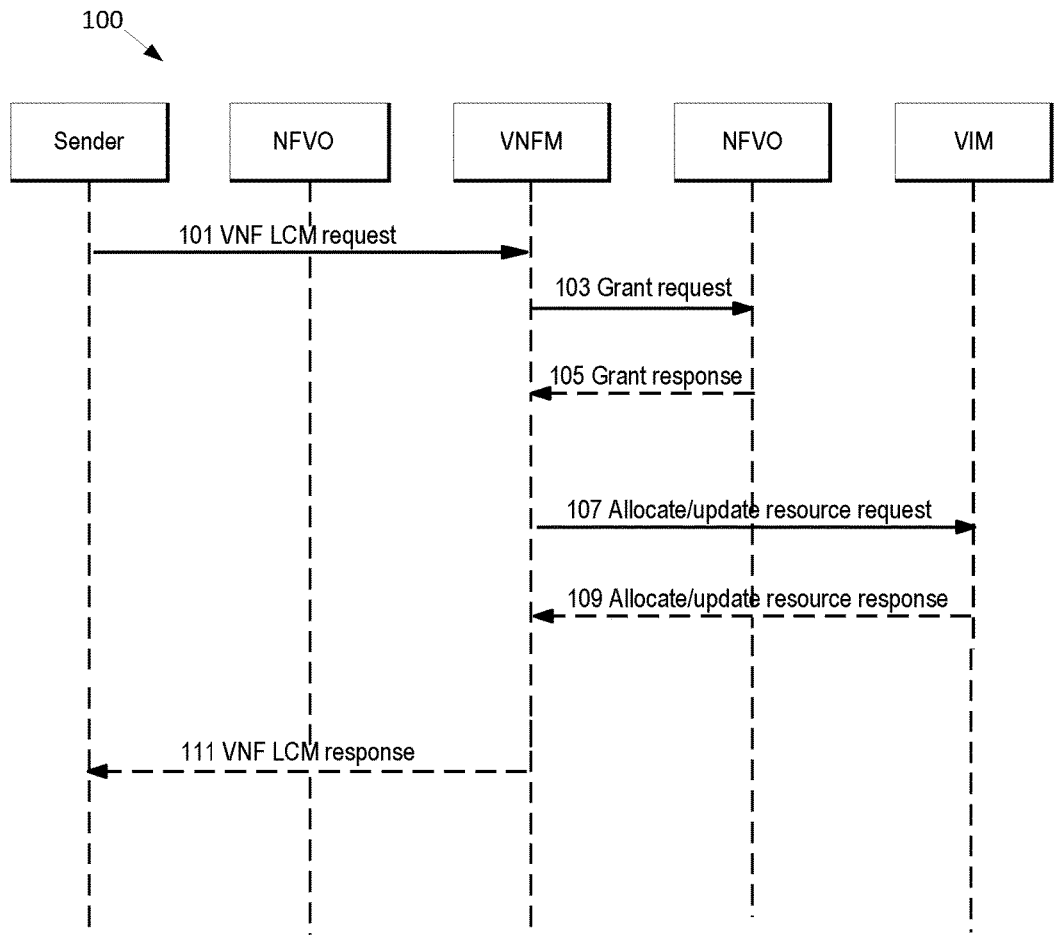
FIG. 1 illustrates a flow diagram of a method for granting a VNF LCM operation.

Granting of a VNF lifecycle management (LCM) operation is an action of giving permission to perform a VNF LCM action and its associated resource management operations. As shown in FIG. 1, a method for granting a VNF LCM operation is disclosed. At step 103, a VNF manager (VNFM) sends a grant request to an NFV orchestrator (NFVO) to ask for permission of one VNF LCM operation. At step 105, the NFVO processes the request and returns a response to the VNFM. At step 107, if the response is successful, the VNFM issues a needed resource request to a virtualized infrastructure manager (VIM). At step 111, after completing the resource request, the VNFM notifies of successful VNF LCM operation. In one embodiment of the present disclosure, the grant illustrated by step 105 may be used to create permissions for multiple operations, as will be disclosed below.

Figure 2:
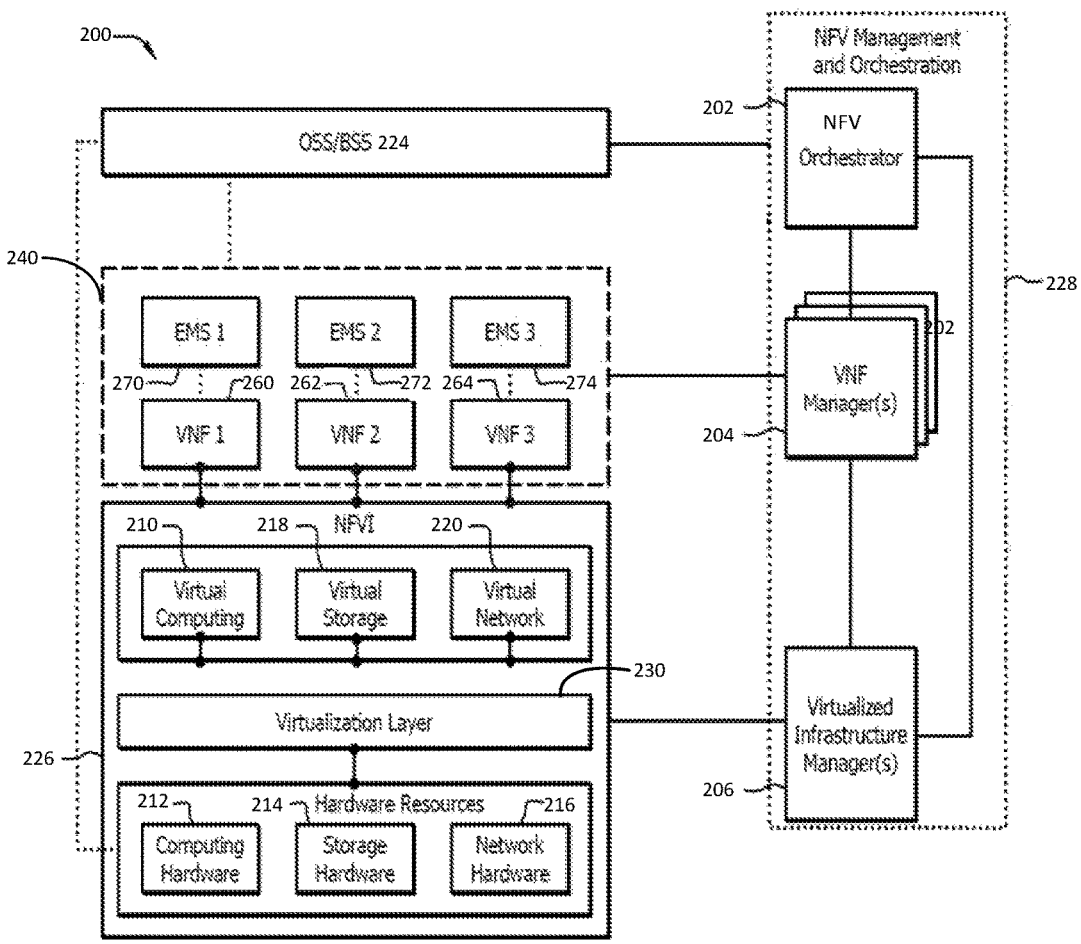
FIG. 2 illustrates a schematic diagram of an embodiment of an NFV system.

FIG. 2 is a schematic diagram of an embodiment of an NFV system 200. Some of this system is described in Network Functions Virtualization (NFV): Management and Orchestration (NFV-MANO), ETSI NFV-MAN 001 v1.1.1 (2014-12), which is hereby incorporated into this application in its entirety as if reproduced in full. The NFV system 200 may comprise an NFV Management and Orchestration (NFV-MANO) 228, an NFV Infrastructure (NFVI) 226, a virtual function 240, and one or more Operations Support Systems (OSSs) and Business Support Systems (BSSs) (OSS/BSS) 224. The virtual function 240 may comprise a plurality of virtual network function (VNF) elements 260, 262, and 264, a plurality of element management system (EMS) elements 270, 272, and 274 that can be configured to perform the typical management functionality for the plurality of VNF elements 260, 262, and 264. While three (3) VNF and EMS elements are shown in FIG. 2, it is expressly contemplated that any number of these elements may be found in a system, and the selection of three is purely for the purpose of convenience. Moreover, it is understood that alternate configurations are contemplated by this disclosure, e.g., where a plurality of VNF elements 260, 262, and 264 are controlled by a single EMS.

The VNF elements are used to perform a virtualisation of a network function in a non-virtualised network. For example, the network functions in the non-virtualised network may be 3GPP Evolved Packet Core (EPC) network elements, e.g. Mobility Management Entity (MME), Serving Gateway (SGW), Packet Data Network Gateway (PGW); elements in a home network, e.g. Residential Gateway (RGW); and conventional network functions, e.g. Dynamic Host Configuration Protocol (DHCP) servers, firewalls, etc. For example, VNF 260 can be composed of one or more internal components, called virtualised network function components (VNFCs). Each VNFC provides a defined sub-set of that VNF's functionality, with the main characteristic that a single instance of this component maps 1:1 against a single virtualisation container. For example, one VNF can be deployed over multiple Virtual Machines (VMs), where each VM hosts a VNFC of the VNF. However, in some cases, the whole VNF can be deployed in a single VM as well. A VM may be virtualized computation environment that behaves like a physical computer or server, which has all its components (processor, memory/storage, interfaces/ports) of a physical computer/server and is generated by a hypervisor, which partitions the underlying physical resources and allocates them to VMs. A hypervisor may be piece of software which partitions the underlying physical resources and creates virtual machines, and isolates the virtual machines from each other.

The NFV-MANO 228 may be responsible for the operation, management, and coordination of VNF elements 260, 262, and 264 and the respective NFVI 226. The NFV-MANO 228 may comprise an NFV Orchestrator (NFVO) 202, one or more VNF managers (VNFMs) 204, and one or more Virtualized Infrastructure Manager (VIM) entities 206. The NFVO 202 can manage the network service (NS) lifecycle and coordinates the management of NS lifecycle, VNF lifecycle (supported by the VNFM 204) and NFVI resources (supported by the VIM 206) to ensure an optimized allocation of the necessary resources and connectivity. The VNFM 204 may communicate with VNF elements 260, 262, and 264 and be responsible for VNF lifecycle management (e.g. instantiation, update, query, scaling, and termination). For example, in one embodiment a VNFM 204 may be deployed for each VNF elements 260, 262, and 264. In other embodiments, a VNFM 204 may serve multiple VNF elements 260, 262, and 264. The VIM 206 can be responsible for controlling and managing the NFVI compute, storage and network resources. In other words, the VIM 206 may be configured to control and manage the interaction of a VNF with the compute, storage and network resources in NFVI 226. For example, the VIM 206 may perform resource management functions, such as management of infrastructure resource and allocation (e.g. increase resources to VMs, improve energy efficiency, and resource reclamation). The VIM 206 and the VNFM 204 may communicate with each other for resource allocation requests and to exchange virtualized hardware resource configuration and state information.

The NFVI 226 represents various hardware and software components which build up the environment in which VNFs are deployed, managed and executed. For example, the hardware components in the NFVI 226 may include computing hardware 212, storage hardware 214, and network hardware 216 that provide processing, storage and connectivity to VNF entities 260, 262, and 264 through a virtualization layer 230. The computing hardware 212 may be any device configured to, designed to, or otherwise enabled to provide processing and computing resources. The storage hardware 214 may be any kind of device which is used to store information for later retrieval. Examples of storage devices include flash memory, magnetic rotation disks, optical disks, or any other mechanism capable of storing information for later retrieval. Storage hardware 214 may be differentiated between shared network attached storage (NAS) and local storage that is connected directly to the NFVI using an internal bus or other attachment mechanism. In one embodiment, the resources from the computing hardware 212 and storage hardware 214 may be pooled together. The network hardware 216 may be switches that is configured to perform switching functions, e.g. routers, and wired or wireless links. The network hardware 216 may span across a plurality of network domains.

The virtualization layer 230 within the NFVI 226 may abstract the hardware resources, i.e., computing hardware 212, storage hardware 214, and network hardware 216 and decouple one or more of the VNF elements 260, 262, and 264 from the underlying hardware. For example, the virtualization layer 230 may be responsible for abstracting and logically partitioning hardware resources, enabling the software that implements the VNF to use the underlying virtualized infrastructure, and providing virtualized resources to the VNF. The virtualized resources controlled by the Virtualization Layer 230 may include a virtual computing 210, a virtual storage 218, and a virtual network 220.

Figure 3:
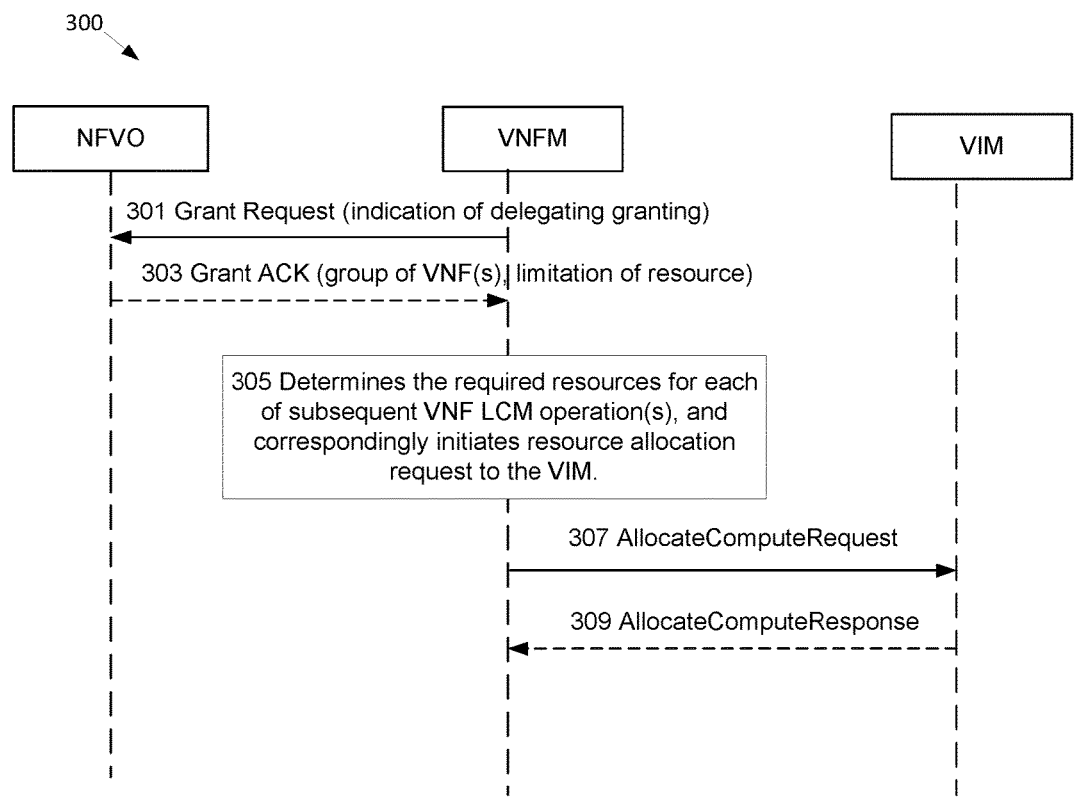
FIG. 3 illustrates a flow diagram of an embodiment of a method for resource management.

FIG. 3 illustrates a flow diagram of an embodiment of a method 300 for resource management. For example, the embodiment method 300 may be implemented in the context of the NFV system 200 as illustrated in FIG. 2. In the embodiment of FIG. 3, a delegating granting scheme is provided to grant a VNFM authority to perform multiple VNF management operations for one or more VNFs (for illustrative purposes as shown in FIG. 2 as VNF 260, 262, and 264) without asking explicit permission from a NFVO each time.

At step 301, the VNFM sends a grant request message indicating the intent for delegating granting permission. For example, the grant request message may include an indication of delegating granting for the instantiation, maintenance and termination of various functions of a NFV.

At step 303, the NFVO checks its internal policies and available capacity, and then responds with a grant acknowledgement (ACK) message including a delegating granting decision. This delegating granting decision may be used to approve or deny the request. In some embodiments the delegating granting decision includes at least one of a granting granularity and resource constraint (e.g., permitted capacity) in which the NFVO allows the VNFM to perform VNF lifecycle management (LCM) operations. However, it is explicitly understood that this granularity may not be shared with the VNFM in all embodiments.

The VNF LCM operations, for example, may be all operations needed to request and manage associations of NFVI Resources to a VNF, and maintain such associations in conformance with a VNF Descriptor and authorized run-time changes, throughout the lifecycle of the VNF. The VNF LCM operations may include different types of operations (e.g., instantiating, scaling, updating, upgrading or terminating operations).

In one embodiment, the granting granularity may indicate the range of VNFs granted to the VNFM. In one example, the range of VNFs granted may be indicated as identifiers of a group of VNFs. In another example, the range of VNFs granted may be indicated as an identifier of a single VNF or identifiers of all VNFs belonging to the VNFM. When applying to all VNFs belonging to the VNFM, it can be referred to as a VNFM level delegating.

In another embodiment, the granting granularity may further indicate the VNF LCM operation(s) granted for each of the identified VNF(s) granted to the VNFM.

In some embodiments, while not shown in FIG. 3, it is understood that step 301 may be omitted and the NFVO may send to the VNFM the delegating granting decision on its own initiative. In response to receiving the delegating granting decision, the VNFM may respond with an acknowledgement message.

At step 305, for each subsequent VNF LCM operation to be performed, the VNFM checks if the subsequent VNF LCM operation is in the scope of permission based on the delegating granting decision received from the NFVO. If yes, the VNFM determines the required resources for the subsequent LCM operation and correspondingly determines to initiate a resource allocation request to a VIM, under the resource constraint, if any apply. If the subsequent VNF LCM operation is determined to be outside the scope of permission, the VNFM has to send an additional explicit grant request to the NFVO, instead of performing subsequent steps.

At step 307, the VNFM sends AllocateComputeRequest message to the VIM for the subsequent VNF LCM operation. The AllocateComputeRequest may be the resource allocation request and can comprise a plurality of fields including, but not limited to, computeName, reservationId, computeData, affinityConstraint, antiAffinityConstraint, vcImageId, metaData, resourceGroupId, and locationConstraints. These fields are discussed with more detail in ETSI GS NFV-IFA 005 V2.1.1 (2016-04) Table 7.3.1.2.2-1: "Allocate Virtualised Compute Resource operation." ETSI GS NFV-IFA 005 V2.1.1 (2016-04) is hereby incorporated by reference as if reproduced in full.

At step 309, the VIM responds AllocateComputeResponse message to the VNFM. The AllocateComputeResponse message can also comprise a plurality of fields including, but not limited to, computeName, reservationId, computeData, affinityConstraint, antiAffinityConstraint, vcImageI, metaData, resourceGroupId, and locationConstraints.

In some embodiments, while not shown in FIG. 3, it is explicitly understood that steps 305-309 may be repeated for each subsequent VNF LCM operation to be performed.

According to the embodiment of FIG. 3, as the VNFM does not have to send a request for permission to the NFVO for each subsequent VNF LCM operation to be performed each time, it can reduce a high traffic exchange between the VNFM and the NFVO during VNF LCM operations. The efficiency of interaction between the NFVO and the VNFM is improved. Therefore, it is understood that in some embodiments the VNFM can be preapproved for permissions by the NFVO for a subsequent VNF LCM operation. It is further understood that this permission may be revoked by the NFVO through an additional message to the VNFM which is used to indicate to the VNFM that the grant permission has been revoked. This revocation of permission may be used to provide additional security in the event that the NFVO is no longer authorized for the permission.

Figure 4:
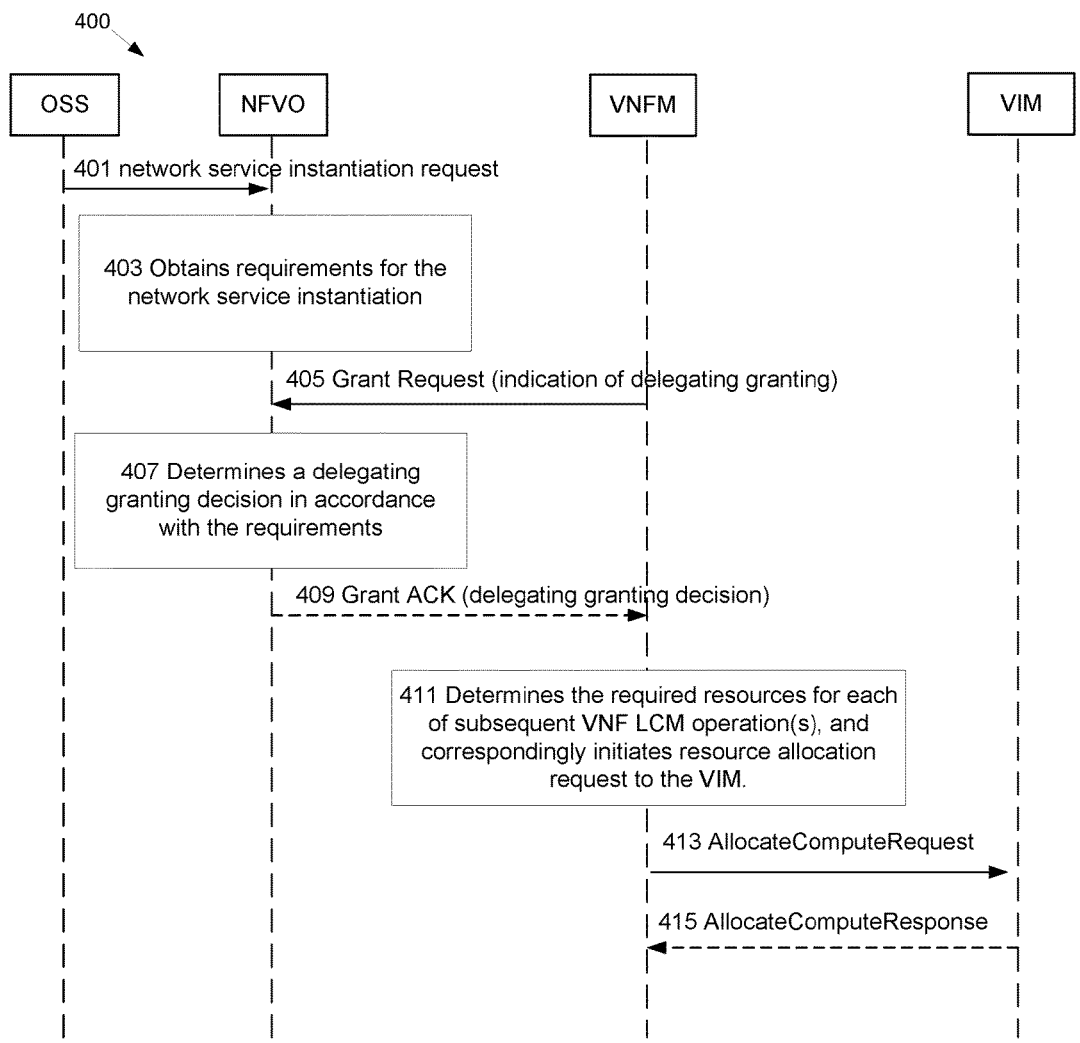
FIG. 4 illustrates a flow diagram of another embodiment of a method for resource management.

FIG. 4 illustrates a flow diagram of another embodiment of a method 400 for resource management. For example, the embodiment method 400 may be implemented in the context of the NFV system 200 as illustrated in FIG. 2. In the embodiment of FIG. 4, a delegating granting scheme is provided to make a VNFM aware of one or more constraints on network service (NS) level so that the one or more constraints may be applied to the constituent VNFs of the NS.

At step 401, OSS initiates a network service instantiation request to a NFVO. In one embodiment, the network service instantiation request may include an indication of specific requirements for the network service instantiation. For example, the specific requirements for the network service instantiation may be indicated by network service input instantiated parameters included in the network service instantiation request.

In some embodiments, it is expressly understood that the OSS may be replaced with other entity configured or designed to initiate a request of network service lifecycle management (LCM) operation. For example, the other entity may be the NFVO. Moreover, it is also understood that the network service instantiation is just an example for the purpose of illustration and other types of network service LCM operations could be used in the embodiment method. The network service LCM operations may include, but not limited to, network service instantiation, termination, scaling and updating operations etc.

At step 403, the NFVO obtains the specific requirements for the network service instantiation. In one embodiment, the NFVO derives the specific requirements from the network service instantiation request. In another embodiment, the NFVO derives the specific requirements from a network service descriptor. In some embodiments, it is understood that step 401 may be omitted depending on the configuration.

The specific requirements for the network service instantiation, for example, includes at least one type from a group of: affinity/anti-affinity policies, dependency policies between different VNFs in the network service and other resource constraints for related VNFs (e.g., deployment locations constraints for one or more VNFs in the network service).

The affinity/anti-affinity policies include, but not limited to policies that force Virtual Links (VLs) to share the same physical connectivity, area policies with respect to location restrictions, node policies for virtualised compute resources that force virtualised compute resources to be on the same compute node or not, and node policies for virtualised storage resources that force virtualised storage resources to be on the same storage node or not.

At step 405, the VNFM associated with the network service instantiation sends a grant request message including an indication of delegating granting to the NFVO.

At step 407, the NFVO determines a delegating granting decision in accordance with the specific requirements for the network service instantiation. The delegating granting decision indicates a permission allowed for the VNFM to perform multiple VNF LCM operations under one or more constraints without asking explicit permission from the NFVO each time.

In one embodiment, the delegating granting decision in compliance with the specific requirements may related to various different types of constraints. In one example, the constraint may relate to a granting granularity in which the NFVO allows the VNFM to perform VNF lifecycle management operations. In another example, the constraint may be a resource constraint in which the NFVO allows the VNFM to perform VNF lifecycle management operations. In yet another example, the constraint may relate to a policy about selected VIM(s) or VIM identification (ID) and host ID or VIM ID and server group ID for a specific VNF (to comply with the affinity/anti-affinity policies for multiple VNFs which are managed by different VNFMs and are in the network service). While three examples of constraints are given, it is understood that there are other constraints for VNF LCM operations which may be used.

In one example, the granting granularity may indicate the range of VNFs granted to the VNFM. In some implementations, the range of VNFs granted may be indicated as identifiers of a group of VNFs. In some implementations, the range of VNFs granted may be indicated as an identifier of a single VNF or identifiers of all VNFs belonging to the VNFM. In another example, the granting granularity may further indicate the VNF LCM operation(s) granted for each of the identified VNF(s) granted to the VNFM.

In one example, the resource constraint may indicate a permitted capacity authorized for one or more VNFs granted to the VNFM.

In one example, the policy about selected VIM(s) are configured to define which VIM(s) could be selected for a specific VNF in the network service. In one particular example, the delegating granting decision may include a VIM identification (ID) that indicates a selected VIM for the specific VNF. In another example, the delegating granting decision may include a VIM ID and host ID that indicates a physical node that provides physical resources to host the specific VNF. In yet another example, the delegating granting decision may include a VIM ID and server group ID that indicates a group of physical nodes that provide physical resources to host the specific VNF.

At step 409, the NFVO responds a grant ACK message including the delegating granting decision to the VNFM.

In some embodiments, while not shown in FIG. 4, it is understood that step 405 may be omitted and the NFVO may send to the VNFM the delegating granting decision on its own initiative. In response to receiving the delegating granting decision, the VNFM may respond with an acknowledgement message.

At step 411, for each subsequent VNF LCM operation to be performed, the VNFM checks if the subsequent VNF LCM operation is in the scope of permission based on the delegating granting decision. If yes, the VNFM determines the required resources for the subsequent LCM operation and correspondingly determines to initiate a resource allocation request to a VIM, under the resource constraint, if any apply. If the subsequent VNF LCM operation is determined to be outside the scope of permission, the VNFM has to send an additional explicit grant request to the NFVO, instead of performing subsequent steps.

At step 413, the VNFM sends AllocateComputeRequest message to the VIM for the subsequent VNF LCM operation.

At step 415, the VIM responds AllocateComputeResponse message to the VNFM.

In some embodiments, while not shown in FIG. 4, it is explicitly understood that steps 411-415 may be repeated for each subsequent VNF LCM operation.

According to the embodiment of FIG. 4, as the VNFM does not have to send a request for permission to the NFVO for each subsequent VNF LCM operation to be performed each time, it can reduce a high traffic exchange between the VNFM and the NFVO during VNF LCM operations. Moreover, the NFVO makes the VNFM aware of one or more constraints on network service level to ensure that the one or more constraints are satisfied. Thus a more flexible and intelligent system on VNF LCM operations is provided.

Figure 5:
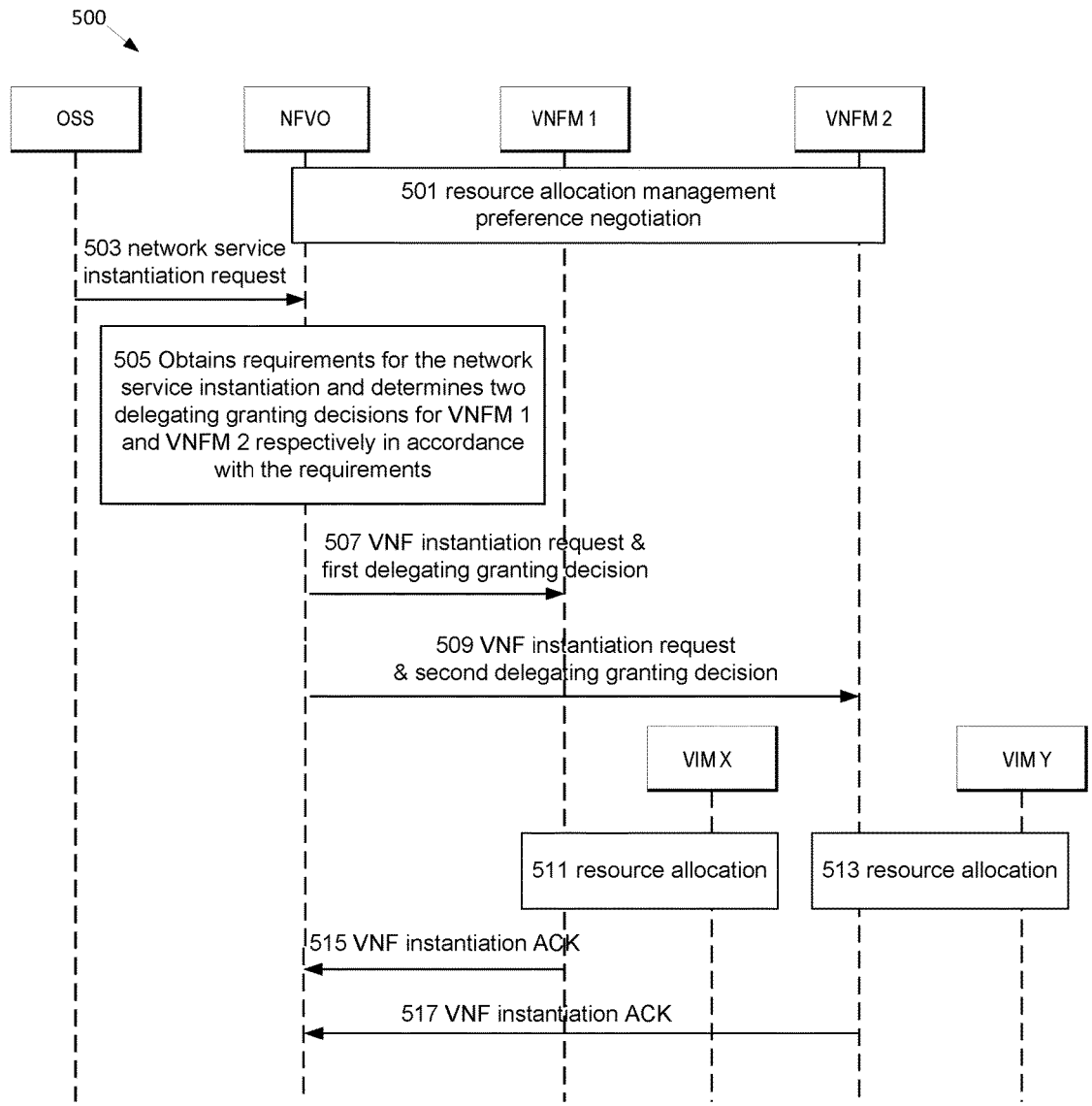
FIG. 5 illustrates a flow diagram of yet another embodiment of a method for resource management.

FIG. 5 illustrates a flow diagram of yet another embodiment of a method 500 for resource management. For example, the embodiment method 500 may be implemented in the context of the NFV system 200 as illustrated in FIG. 2.

At step 501, a resource allocation management preference negotiation among a NFVO, first VNFM (VNFM 1) and second VNFM (VNFM 2) is performed. The negotiation is used to determine if the VNFM 1, VNFM 2 and the NFVO support a delegating granting for VNF LCM operations. In one embodiment, such negotiation could be implemented through pre-configuration by the operator. The pre-configuration may include similar factors related to the delegating granting as described above in the embodiment of FIG. 4. It is expressly contemplated that any number of VNFMs may be implemented in the method embodiment, and the selection of two is purely for the purpose of convenience. It is also understood that step 501 is an optional step.

At step 503, OSS initiates a network service instantiation request to the NFVO. In one embodiment, the network service instantiation request may include an indication of specific requirements for the network service instantiation. For example, the specific requirements for the network service instantiation may be indicated by network service input instantiated parameters included in the network service instantiation request.

In some embodiments, it is expressly understood that the OSS may be replaced with other entity configured or designed to initiate a network service lifecycle management (LCM) operation request. For example, the other entity may be the NFVO. Moreover, it is also understood that the network service instantiation is just an example for the purpose of illustration and other types of network service LCM operations could be used in the embodiment method.

At step 505, the NFVO obtains the specific requirements for the network service instantiation and determines two delegating granting decisions for VNFM 1 and VNFM 2 respectively in accordance with the specific requirements for the network service instantiation. The VNFM 1 and VNFM 2 manage constituent VNF(s) in the network service. A first delegating granting decision is determined for VNFM 1 and a second granting decision is determined for VNFM 2.

In one embodiment, the NFVO derives the specific requirements from the network service instantiation request. In another embodiment, the NFVO derives the specific requirements from a network service descriptor. In some embodiments, it is understood that step 503 may be omitted depending on the configuration.

The specific requirements for the network service instantiation, for example, includes at least one type from a group of: affinity/anti-affinity policies, dependency policies between different VNFs in the network service and other resource constraints for related VNFs (e.g., deployment locations constraints for one or more VNFs in the network service).

The affinity/anti-affinity policies include, but not limited to virtualised network resources policies that force Virtual Links (VLs) to share the same physical connectivity or not, area policies with respect to location restrictions, node policies for virtualised compute resources that force virtualised compute resources to be on the same compute node or not, and node policies for virtualised storage resources that force virtualised storage resources to be on the same storage node or not.

The first delegating granting decision is taken as an example to describe the detailed implementation of delegating granting decisions in the embodiment of FIG. 5. The second delegating granting decision is similar to the first delegating granting decision. The first delegating granting decision indicates a permission allowed for the VNFM 1 to perform multiple VNF LCM operations under one or more constraints without asking explicit permission from the NFVO each time.

In one embodiment, the first delegating granting decision in compliance with the specific requirements may include at least one type from a group of:
  a granting granularity in which the NFVO allows the VNFM 1 to perform VNF lifecycle management operations;
  a resource constraint in which the NFVO allows the VNFM 1 to perform VNF lifecycle management operations;
  a policy about selected VIM(s) or VIM identification (ID) and host ID or VIM ID and server group ID for a specific VNF (to comply with the affinity/anti-affinity policies for multiple VNFs which are managed by different VNFMs and are in the network service); and other constraints for VNF LCM operations.

In one example, the granting granularity may indicate the range of VNFs granted to the VNFM 1. In some implementations, the range of VNFs granted may be indicated as identifiers of a group of VNFs. In some implementations, the range of VNFs granted may be indicated as an identifier of a single VNF or identifiers of all VNFs belonging to the VNFM 1. In another example, the granting granularity may further indicate the VNF LCM operation(s) granted for each of the identified VNF(s) granted to the VNFM 1.

In one example, the resource constraint may indicate a permitted capacity authorized for one or more VNFs granted to the VNFM 1.

In one example, the policy about selected VIM(s) are configured to define which VIM(s) could be selected for a specific VNF in the network service. In one particular example, the delegating granting decision may include a VIM identification (ID) that indicates a selected VIM for the specific VNF. In another example, the delegating granting decision may include a VIM ID and host ID that indicates a physical node that provides physical resources to host the specific VNF. In yet another example, the delegating granting decision may include a VIM ID and server group ID that indicates a group of physical nodes that provide physical resources to host the specific VNF.

At step 507, the NFVO sends the first delegating granting decision to VNFM 1.

At step 509, the NFVO sends the second delegating granting decision to VNFM 2.

In one embodiment, the NFVO may send the delegating granting decision applied to a specific VNF with the corresponding VNF instantiation request. In another embodiment, the NFVO may send the delegating granting decision applied to multiple VNFs which are included in the network service and managed by the VNFM (VNFM 1 or VNFM 2) with the first VNF instantiation request of the network service. In yet another embodiment, the NFVO may send the delegating granting decision through an individual message.

At step 511, the VNFM 1 instantiates the VNF(s) based on the first delegating granting decision from the NFVO. The VNFM 1 interacts with the corresponding VIM-X to perform VNF instantiation.

At step 513, the VNFM 2 instantiates the VNF(s) based on the second delegating granting decision from the NFVO. The VNFM 2 interacts with the corresponding VIM-Y to perform VNF instantiation.

At step 515, the VNFM 1 notifies the NFVO the acknowledgement of VNF instantiation.

At step 517, the VNFM 2 notifies the NFVO the acknowledgement of VNF instantiation.

In some embodiments, while not shown in FIG. 5, it is explicitly understood that steps 511-517 may be repeated for each subsequent VNF LCM operation.

It is understood that the application to the delegating granting case in the embodiments is just an example for the purpose of illustration. The solution of the present disclosure may be applied to other case, in which the NFVO bases on network service requirements to send VNF LCM policy to the VNFM. The VNFM is thus aware of one or more constraints on network service level to meet the one or more constraints.

According to the embodiment of FIG. 5, as the VNFMs do not have to send a request for permission to the NFVO for each subsequent VNF LCM operation to be performed each time, it can reduce a high traffic exchange between the VNFMs and the NFVO during VNF LCM operations. Moreover, the NFVO makes the VNFMs aware of one or more constraints on network service level to ensure that the one or more constraints are satisfied. Thus a more flexible and intelligent system on VNF LCM operations is provided.

In one embodiment of the present disclosure, a system for resource management comprising means that obtains requirements for a network service LCM operation is disclosed. The embodiment system also includes means that determines a delegating granting decision for a VNFM associated with the network service LCM operation in accordance with the requirements and means that sends the delegating granting decision to the VNFM. The delegating granting decision indicates a permission allowed by a NFVO for the VNFM to perform multiple VNF LCM operations under one or more constraints. With respect to the detailed implementation of the features in this embodiment, reference can be made to the other embodiments discussed above for the sake of conciseness. It is understood that selected features of this embodiment may be combined with selected features of other example method or system embodiments of the present disclosure.

Figure 6:
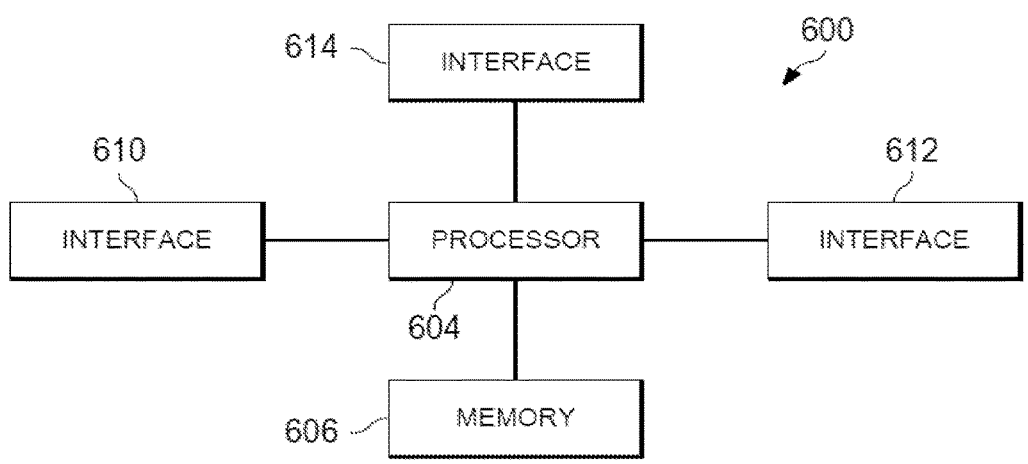
FIG. 6 illustrates a block diagram of an embodiment processing system for performing methods described herein.

FIG. 6 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in the figure. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in the figure, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 610, 612, 614 connects the processing system 600 to a transceiver adapted to transmit and receive signaling over the telecommunications network.

Figure 7:
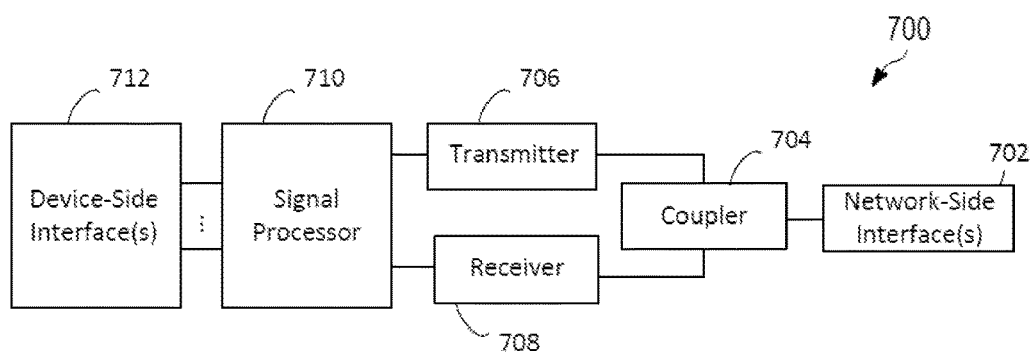
FIG. 7 illustrates a block diagram of a transceiver adapted to transmit and receive signaling over a telecommunications network.

FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It is also understood that to the extent the term "indicate" is used in the specification or claims, it is intended to mean not only "explicitly indicate" but also "implicitly indicate". In this way, the indication may be positive (explicit), neutral (passive), or any other indication that access is not precluded.

Although a combination of features is shown in the illustrated examples, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for resource management comprising:
   obtaining, by a network functions virtualization orchestrator (NFVO) processor, requirements for a network service lifecycle management (LCM) operation;
   determining, by the NFVO processor, a delegating granting decision for a virtualized network function (VNF) manager (VNFM) associated with the network service LCM operation in accordance with the requirements for the network service LCM operation, wherein the delegating granting decision grants a permission for the VNFM to perform multiple subsequent VNF LCM operations without sending a request for permission to the NFVO for a subsequent VNF LCM operation under one or more constraints in the delegating granting decision; and
   sending, by the NFVO processor, the delegating granting decision indicating the permission for the VNFM to perform multiple subsequent VNF LCM operations without sending the request for permission to the NFVO for the subsequent VNF LCM operation to the VNFM.

2. The method of claim 1, wherein the obtaining the requirements comprises:
   deriving, by the NFVO processor, the requirements from a network service descriptor associated with the network service LCM operation.

3. The method of claim 1, wherein the obtaining the requirements comprises:
   receiving, by the NFVO processor, a request for the network service LCM operation; and
   deriving, by the NFVO processor, the requirements from the request for the network service LCM operation.

4. The method of claim 1, wherein the requirements for the network service LCM operation comprises one or more type from a group of:
   an affinity;
   an anti-affinity policy;
   a dependency policy between different VNFs associated with the network service LCM operation; or
   a deployment location constraint for one or more VNFs associated with the network service LCM operation.

5. The method of claim 1, wherein the delegating granting decision comprises one or more type from a group consisting of:
   a granting granularity in which the NFVO allows the VNFM to perform multiple VNF LCM operations;
   a resource constraint in which the NFVO allows the VNFM to perform multiple VNF LCM operations; or
   a selected virtual infrastructure manager (VIM) identification.

6. The method of claim 5, wherein the granting granularity indicates one or more VNFs allowed to the VNFM and the multiple VNF management operations granted for each of the allowed one or more VNFs.

7. The method of claim 5, wherein the resource constraint indicates a permitted capacity authorized for one or more VNFs allowed to the VNFM.

8. The method of claim 6, wherein the one or more VNFs comprises a single VNF, group of VNFs or all VNFs belonging to the VNFM.

9. The method of claim 1, further comprising:
   determining, by the VNFM processor, that a VNF management operation is in a scope of permission based on the delegating granting decision upon the VNF management operation being triggered; and
   sending, by the VNFM processor, a resource allocation request for the VNF management operation to a virtual infrastructure manager (VIM).

10. The method of claim 1, wherein the delegating granting decision is sent through a request for a VNF LCM operation.

11. A system for resource management comprising:
    a memory storage comprising instructions; and
    one or more processors in communication with the memory, wherein the one or more processors execute the instructions to:
      obtain requirements for a network service lifecycle management (LCM) operation;
      determine a delegating granting decision for a virtualized network function (VNF) manager (VNFM) associated with the network service LCM operation in accordance with the requirements for the network service LCM operation, wherein the delegating granting decision indicates a permission allowed by a network functions virtualization orchestrator (NFVO) for the VNFM to perform multiple subsequent VNF LCM operations without sending a request for permission to the NFVO for a subsequent VNF LCM operation to be performed under one or more constraints in the delegating granting decision; and
      send the delegating granting decision indicating the permission for the VNFM to perform multiple subsequent VNF LCM operations without sending the request for permission to the NFVO for the subsequent VNF LCM operation to the VNFM.

12. The system of claim 11, wherein the requirements are derived from a network service descriptor associated with the network service LCM operation.

13. The system of claim 11, wherein the one or more processors further execute the instructions to receive a request for the network service LCM operation including the requirements.

14. The system of claim 11, wherein the requirements for the network service LCM operation comprises one or more type from a group of:
    an affinity policy;
    an anti-affinity policy;
    a dependency policy between different VNFs associated with the network service LCM operation; or
    a deployment location constraint for one or more VNFs associated with the network service LCM operation.

15. The system of claim 11, wherein the delegating granting decision comprises one or more type from a group consisting of:
    a granting granularity in which the NFVO allows the VNFM to perform multiple VNF LCM operations;
    a resource constraint in which the NFVO allows the VNFM to perform multiple VNF LCM operations; or
    a selected virtual infrastructure manager (VIM) identification.

16. The system of claim 15, wherein the granting granularity indicates one or more VNFs allowed to the VNFM and the multiple VNF management operations granted for each of the allowed one or more VNFs.

17. The system of claim 15, wherein the resource constraint indicates a permitted capacity authorized for one or more VNFs allowed to the VNFM.

18. The system of claim 16, wherein the one or more VNFs comprises a single VNF, group of VNFs or all VNFs belonging to the VNFM.

19. A method for resource management comprising:
- determining, by a network functions virtualization orchestrator (NFVO) processor, a delegating granting decision for a virtualized network function (VNF) manager (VNFM) in accordance with a request by the VNFM, wherein the delegating granting decision indicates a permission allowed for the VNFM to perform multiple subsequent VNF lifecycle management (LCM) operations without sending a request for permission to the NFVO for a subsequent VNF LCM operation under one or more constraints in the delegating granting decision; and
- sending, by the NFVO processor, the delegating granting decision indicating the permission for the VNFM to perform multiple subsequent VNF LCM operations without sending the request for permission to the NFVO for the subsequent VNF LCM operation to the VNFM.

\* \* \* \* \*